Nov. 28, 1950  D. F. SILVER  2,531,536
FLAVOR BUD
Filed Aug. 4, 1948
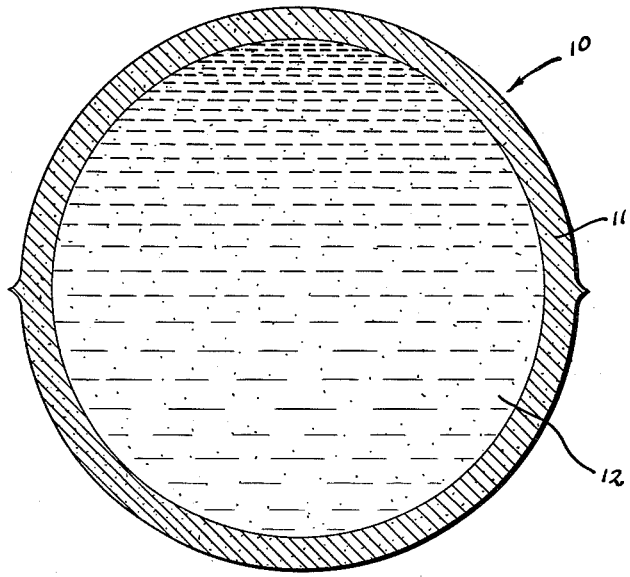
INVENTOR.
DAVID F. SILVER
BY
Leo C. Krazinski
ATTORNEY Patented Nov. 28, 1950

2,531,536

UNITED STATES PATENT OFFICE 2,531,536

FLAVOR BUD

David F. Silver, Peekskill, N. Y.

Application August 4, 1948, Serial No. 42,379

4 Claims. (Cl. 99—140)

This invention relates to improvements in the method of supplying flavors to various food stuffs, such as gelatin desserts, prepared puddings, pie fillings, cake mixtures, soluble coffee, and the like, particularly such as are intended for sale in packages for preparation by the householder for consumption.

It is a main objective herein to provide such means in a manner and form to present such food products to the ultimate consumer in attractive and palatable form and with the retention of the full flavoring values, from the time of original packaging, and during transportation and their shelf-life.

It is another object herein to provide a material for encapsulating the desired flavoring extracts in liquid form in separate units (as flavor buds) for eventual admixture with the given food product, so that the liquid flavor will remain substantially unimpaired by breakage, leakage, bleeding, or other loss in flavoring quality as by evaporation, oxidation, or by prolonged previous contact with the substance of the material to be flavored, and of a form and substance which can be conveniently and effectively admixed with and incorporated in the food article to be flavored.

It is a further object to afford convenient and effective means for the ultimate consumer to prepare such food stuffs for the table. Other objectives and advantages of the means and methods herein presented will become apparent from the following further disclosures and the appended claims and drawing.

Another feature of the invention, as it may be desired, is directed to esthetic and sales values, by the incorporation of appropriately selected coloring matter in the shell of the flavor-buds together with the addition of an appropriate ingredient to the shell substance to control the color and eventual loss of the desired color effect. Thus, in the case of the herein exemplified strawberry bud, coloring material for the shell is illustrated by the addition of a given permitted food dye, in conjunction with an acid, not incompatible with the character of the flavor, for imparting the proper color shade. Considerable latitude is obviously permissible in this regard.

A preferred embodiment of the invention has been chosen for purposes of illustration and description and is shown in the accompanying drawing, forming a part of the specification, which drawing shows a sectional view of a flavor bud.

Referring now to the drawing, there is shown a flavor bud 10, preferably of elliptical or arcuate shape, comprising a shell or wall 11 of predetermined ingredients, as will be described hereinafter, and a liquid center 12 constituting a desired flavoring extract sealed within the shell.

In carrying out this invention, I prepare both the flavoring extracts to be used as liquid centers for the buds, and the ingredients of the material for the encapsulating shell, so that they may effectively retain their relative cooperative functions for prolonged periods.

Thus, the flavor extract to be retained in independent liquid form until it is actually incorporated with the food product, is dissolved in glucose. It has been found that carbohydrates have a strong physical affinity for many of the flavoring "extracts," natural and artificial, which are suitable for use in this connection. Glucose (Bé. 43°) is especially well adapted for the indicated purpose, holding the flavor extracts to its body substance with little tendency to volatilization especially when properly protected. Such protection is afforded by the shell as composed of materials of the character as disclosed in the examples. In the given examples, there is included with the shell substance a relatively adjusted amount of glucose, being also the exemplified solvent of the given liquid flavor center. In this formula the glucose serves as a retardant against evaporation of moisture from the center, under ordinary atmospheric conditions.

Methods are known for encapsulating various pharmaceutical preparations in liquid form. Liquids in other lines of art have also been prepared for marketing various liquids in individual measured units of subdivision. No part of this present application is directed to any specific method or means for such encapsulation, and any such known methods may be applied to the purposes hereof.

This means for flavoring the food stuffs, as provided herein, while mainly serviceable for smaller subdivisions to be utilized at one time after the original package has been opened, may also be extended to larger sized packages adapted for several servings. Usually after such larger packages, when provided with known flavoring means, have been opened, there is even more rapid deterioration of the flavor factor, after the contents are exposed to more direct atmospheric action. The special means provided herein for supplying the flavoring substance in separate units, with well protected liquid centers, enables the producer to include additional flavor units for later servings because the shells provided for these new and improved flavor-buds serve to protect the liquid centers for prolonged periods even when the bud itself is more directly exposed.

"Flavor Buds" of various types as prepared heretofore have, for one reason or another, not been found to meet all the requirements for adequate service. The need is thus apparent for a new form with improved properties for specific application.

The basic requirements for this field of food service are that the flavor, without sacrifice of its original distinctive quality, be contained within, but without being a part of the container shell, and that this shell be compatible with the liquid center and the product to be flavored.

A formula for preparing a generally satisfactory material, from which to prepare shells for "flavor buds" which are also physically strong enough to withstand present-day requirements for high-speed production, handling and filling operations, adaptable to high-speed production methods, and which at the same time possess the other indicated essential properties, have not been available. The nearest approach has been the pharmaceutical gelatin capsule, which meets the needs of production and handling requirements, but is limited in use because it will not dissolve in cold and is only slowly soluble in hot solution. Many flavors and essences cannot be held by the capsule, which is also frequently not compatible with the product to be flavored.

By way of illustration, but without any precise limitation as to materials and relative quantities, novel formulas for the preparation of such "flavor buds" are herewith outlined. The first illustration is specifically directed to a "flavor bud" to be used for a package of strawberry flavor gelatin dessert. In general, this example is adaptable to a large variety of food preparations and to kind and type of flavors. Obviously appropriate adjustment of the formulas may be made to other specific uses without departing from the essential and basic scope of the invention.

Formulas are thus presented both for the liquid center, and for the correlated shell to contain the same, as applied to the production of a strawberry flavor-bud for a gelatin dessert, together with general suggestions for preferred methods for carrying the invention into practical operation and utilization.

This "flavor-bud" is approximately round or elliptical in shape, about ⅞" diameter, in size, of strawberry color, composed of a hard shell and a viscous liquid flavored center. The shell is physically strong enough to withstand shock encountered in handling, packing, and transportation of the bud in bulk, or in high-speed handling of the unit bud in packaging operations. Its component material, size, and shape are all adapted to contribute to these desiderata.

The complete bud used as a flavor unit of the usual 3 ounce package of gelatin dessert will dissolve in 1 pint of water of about 150° F. in approximately 2 minutes, which is essentially the same time required for the solution of the dessert powder.

Such a strawberry "flavor bud" weighs approximately 5 gms., made up of 40% by weight liquid center, and 60% by weight outer shell. The outer shell composition is made up by the following formula, in parts by weight:

| | |
|---|---:|
| Water | 13.50 |
| Sodium Tartrate | 3.00 |
| Tartaric Acid | .15 |
| Glucose | 3.60 |
| Gelatin | .15 |
| Strawberry Dye | .05 |
| Anhydrous Dextrose | 79.55 |
| | 100.00 |

The sodium tartrate, tartaric acid, glucose, gelatin and dye are dissolved in the water, and the solution added to the anhydrous dextrose while mixing. Under agitation, this reverts to dry granulars. The mass is subsequently milled through a Fitzgerald mill, using about a #40 screen. This resulting powder is thermo-plastic, capable of being moulded by pressure with or without an elevation in temperature, using dies of the desired size and shape.

As a general guide for eventual modifications in adaptation to varying requirements for particular situations, it may be noted that the sodium tartrate serves as a plasticizing agency in connection with the body-substance of the anhydrous dextrose; the tartaric acid is used in balance with the sodium tartrate for maintaining a pH slightly on the acid side as an aid for attainment of the color values of the added dye; and the glucose used in this shell material serves the function of a balanced moisture control and as a check against moisture evaporation from the liquid center, and thus also against the loss of flavor values by volatilization through a dried and porous shell. This glucose thus also functions to a degree as a plasticizing agent in conjunction with the other ingredients. The small amount of gelatin disclosed in the formula above here serves as an adjuvant supplementing the glucose and may optionally be omitted on occasion.

The liquid center has been made up of the following composition by weight approximately:

| | |
|---|---:|
| Glucose Bé. 43° | 97.500 |
| Strawberry Fruit Flavor | 1.875 |
| Strawberry Imitation Flavor | .625 |
| | 100.000 |

The flavors are well blended by mixing into the glucose, and gentle warming may be employed to facilitate this operation.

A further illustration is presented, as an indication of the manner in which modification may be applied, according to special requirements. Thus, the following example serves as a method for the production of a "coffee bud".

The total weight and ratio of center to shell is subject to greater variations in the case of coffee depending on the nature and type of coffee concentrate used. Thus, for example, the "bud" may be as heavy as 10 gms., and the center as great as 60% of the total weight, and obviously, in the case of "coffee buds," there is more occasion also for variations in other respects, depending on variety and type of coffee employed and the strength and kind of flavor desired.

As a specific example, the formula for the outer shell is composed in parts by weight as follows:

| | |
|---|---:|
| Coffee color, aqueous extract | 13.50 |
| Sodium tartrate | 3.00 |
| Glucose | 3.75 |
| Anhydrous dextrose | 79.75 |
| | 100.00 |

The use of gelatin and the tartaric acid is not necessary in the above formula, when using coffee color extract. Otherwise the method of preparation for the shell is the same as for the exemplified "Strawberry Flavor Bud."

The liquid center for the "coffee bud" is made up of the following composition in parts by weight:

| | |
|---|---:|
| Glucose (Bé. 43°) | 68.00 |
| Coffee extract (concentrated—about 25% coffee solids) | 32.00 |
| | 100.00 |

Under appropriate conditions the glucose of the liquid centers may be partly or wholly substituted by other carbohydrate material such as cane syrup, brown sugar syrups, invert syrups, levulose, etc., caution being exercised by determining if the elected medium be compatible with the kind and type of flavor employed. Flavor or flavor fortification in solid form may also be utilized for special desirable modifications, and dispersed by suspension in the liquid center formula.

Herein, when the terms flavor or flavoring "extracts" are mentioned, it is understood that this embraces natural and synthetic materials which may be used interchangeably in the art. As such substances vary in degree of solubility in the media employed, and depending also on varying quantitative relationship as between solvent and solute, some of these flavoring materials may be in true solution or suspension or both, and so, for convenience of expression, they are referred to herein, and in the appended claims, as being permissibly present in solution and dispersion whether or not in any given case the one in the other physical form actually exists or predominates.

I claim:

1. A flavor bud consisting of an outer encapsulating shell made from a thermoplastic material prepared from a mixture comprising anhydrous dextrose, sodium tartrate, and glucose, with water, in combination with a liquid center comprising a flavoring substance carried by liquid glucose of about Bé. 43°.

2. A flavor bud consisting of an outer shell made up from a thermoplastic material produced by intermixture of anhydrous dextrose, sodium tartrate, and glucose, in the presence of water, in combination with an inner core of liquid glucose of about Bé. 43° carrying flavoring material.

3. A flavor bud consisting of a liquid center composed of a flavoring material being carried in a menstruum of liquid glucose of about Bé. 43° and, in combination, an outer encapsulating shell consisting of a thermoplastic material incorporating glucose as a co-adjuvant plasticizing ingredient of the shell material and as a retardant against evaporation and volatilization of liquid substance of the center.

4. A coffee bud consisting of a liquid center comprising coffee flavor dispersed in glucose of about Bé. 43° and a housing shell made of a water-soluble thermoplastic material comprising anhydrous dextrose, sodium tartrate and glucose.

DAVID F. SILVER.

REFERENCES CITED

The following references are of record in the file of this patent:

UNITED STATES PATENTS

| Number | Name | Date |
|---|---|---|
| 1,403,473 | Albach | Jan. 17, 1922 |
| 2,071,841 | Kelling | Feb. 23, 1937 |
| 2,088,622 | Stokes et al. | Aug. 3, 1937 |
| 2,258,567 | Epstein et al. | Oct. 7, 1941 |